(12) United States Patent
Sarin et al.

(10) Patent No.: US 10,192,074 B2
(45) Date of Patent: *Jan. 29, 2019

(54) TECHNIQUE FOR DATA LOSS PREVENTION THROUGH CLIPBOARD OPERATIONS (71) Applicant: Symantec Corporation, Mountain View, CA (US)

(72) Inventors: Sumit Manmohan Sarin, Maharashtra (IN); Sumant Modak, Pune (IN); Amit Shinde, Maharashtra (IN); Bishnu Chaturvedi, Pune (IN)

(73) Assignee: Symantec Corporation, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/798,482

(22) Filed: Oct. 31, 2017

(65) Prior Publication Data

US 2018/0053015 A1 Feb. 22, 2018

Related U.S. Application Data (63) Continuation of application No. 14/687,825, filed on Apr. 15, 2015, now Pat. No. 9,805,218.

(30) Foreign Application Priority Data

Mar. 31, 2015 (IN) .......................... 1713/CHE/2015

(51) Int. Cl.
*G06F 17/00* (2006.01)
*G06F 21/62* (2013.01)

(52) U.S. Cl.
CPC .............. *G06F 21/6281* (2013.01)

(58) Field of Classification Search
CPC .................. G06F 21/6245; G06F 21/604
USPC .............................................. 726/1
See application file for complete search history.

(56) References Cited

U.S. PATENT DOCUMENTS

| 7,950,066 | B1 * | 5/2011 | Zuili | G06F 21/6281 713/165 |
| 2007/0011469 | A1 | 1/2007 | Allison et al. | |
| 2007/0011749 | A1 | 1/2007 | Allison et al. | |
| 2008/0028442 | A1 * | 1/2008 | Kaza | G06F 21/56 726/4 |
| 2011/0035783 | A1 | 2/2011 | Terasaki et al. | |
| 2011/0113467 | A1 | 5/2011 | Agarwal et al. | |
| 2012/0016907 | A1 | 1/2012 | Ikeda et al. | |
| 2012/0117611 | A1 * | 5/2012 | Wookey | G06F 21/10 726/1 |
| 2014/0304839 | A1 | 10/2014 | Hansen | |

* cited by examiner

*Primary Examiner* — Mohammad W Reza
(74) *Attorney, Agent, or Firm* — Patterson + Sheridan, LLP (57) ABSTRACT Techniques describe preventing sensitive data from being misappropriated during a clipboard operation. A copy operation for data being copied to a clipboard is intercepted. Information describing a first application from which the data was copied is retrieved. The data and the information are stored into the clipboard. A paste operation is evaluated based on the data, and the information is evaluated against a policy to determine whether the paste operation should be blocked.

15 Claims, 6 Drawing Sheets

TECHNIQUE FOR DATA LOSS PREVENTION THROUGH CLIPBOARD OPERATIONS

CROSS-REFERENCE TO RELATED APPLICATIONS

This application is a continuation of U.S. patent application Ser. No. 14/687,825, filed on Apr. 15, 2015, which claims benefit of Indian Provisional Patent Application Serial No. 1713/CHE/2015 filed Mar. 31, 2015, which are incorporated herein by reference in their entirety.

BACKGROUND

Field

Embodiments presented herein generally relate to data loss prevention (DLP), and more specifically, to preventing sensitive data from being transferred to unauthorized locations during clipboard operations.

Description of the Related Art

Data loss prevention (DLP) generally refers to a variety of techniques to protect sensitive data. In endpoint DLP, a DLP agent can monitor and control activity occurring within a client computing system according to a policy, usually specified by an administrator (e.g., of an enterprise network). The DLP agent can block attempts to transmit sensitive data and generate incident reports describing such attempts.

One potential source of data loss includes clipboard operations performed on a client computing system. In particular, an enterprise does not want a user to copy sensitive data and paste the data into an unauthorized application. For example, an administrator may want to prevent a user on a work computer from copying social security numbers from a spreadsheet and pasting the numbers to a message in a personal e-mail account. As another example, the administrator may want to prevent users from pasting social security numbers into an image and uploading the image (e.g., in place of the original document) to a given destination to avoid detection.

Current approaches to monitor clipboard operations simply monitor copy operations performed by the user. When a user copies data, a DLP agent may intercept the copy operation and analyze the underlying data being copied. If the data corresponds to sensitive information, then the DLP agent can block the copy operation from occurring. However, this approach has several limitations. For instance, because the DLP agent monitors only the copy operation, the DLP agent does not obtain any information regarding a destination for the paste operation. Therefore, an administrator may have difficulty determining remedial steps to take without this information. Another consequence is that the DLP agent can indiscriminately block copy operations even in legitimate cases, e.g., a data entry employee copying and pasting sensitive data from and into cells of a single spreadsheet. False positives generated by the DLP agent may obscure cases where the user intends to leak sensitive data to an unauthorized location.

SUMMARY

One embodiment presented herein describes a method. The method generally includes intercepting a copy operation for data being copied to a clipboard. The method also includes retrieving information describing a first application from which data was copied. The method includes storing the data and the information into the clipboard. A paste operation is evaluated based on the data, the information, and a policy to determine whether the paste operation should be blocked.

Other embodiments include, without limitation, a computer-readable medium that includes instructions that enable a processing unit to implement one or more aspects of the disclosed methods as well as a system having a processor, memory, and application programs configured to implement one or more aspects of the disclosed methods.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments presented herein generally provide techniques for preventing data loss for clipboard operations performed on a client computing system.

Generally, current data loss prevention (DLP) approaches to manage clipboard operations are limited to monitoring copy operations. As a result, an administrator (e.g., of an enterprise network) may be unable to distinguish between instances where sensitive data is copied for legitimate purposes (e.g., copying and pasting within the same application window) and instances where a user is attempting to misappropriate sensitive data. One solution to this issue is to instead monitor paste operations. However, monitoring paste operations presents several challenges. One challenge is to determine whether a paste operation is initiated by a user or an application. Some applications may use a clipboard managed by an operating system. For example, modern productivity applications provide advanced clipboard features, e.g., that allow the user to select data saved to the clipboard for pasting to a document. In doing so, the applications may perform paste operations in the background. Generally, user-initiated paste operations are more of an issue than application-initiated paste operations. However, current DLP techniques are unable to distinguish between user-initiated paste operations and application-initiated operations.

Embodiments presented herein provide a DLP agent which hooks clipboard application programming interfaces (APIs) provided by an operating system (OS). Doing so allows the DLP agent to intercept API calls by applications to the clipboard, e.g., operations for opening the clipboard, saving data to the clipboard, retrieving data from the clipboard, and the like.

When a user copies data displayed by an application, the DLP agent intercepts the operation. The DLP agent then retrieves information associated with the copy operation, such as a name of the source application being used to initiate the copy operation, a process ID for the source application, and the title (or URL) of the document. The DLP agent generates a DLP format instance that includes this information. Further, the DLP agent generates a hash of the data to be copied. The DLP agent caches the DLP format instance, a current window title, and the data hash.

When a user performs a paste operation for data in an application, the DLP agent intercepts the operation. The DLP agent then retrieves the data to be pasted from the clipboard. The DLP agent generates a hash of the data retrieved from the clipboard. The DLP agent then compares previously-cached hash data and window title from the copy operation with the hash of the paste data and the current window title. If the values match, then the DLP agent allows the copy operation to proceed.

However, if values do not match, the DLP agent then determines whether the paste operation corresponds to a user-initiated or an application-initiated paste operation. To do so, the DLP agent may compare a process ID of the current application window (i.e., the active window displayed on the OS) with the process ID of the application performing the paste operation. Non-matching process IDs indicate that the application did not initiate the paste operation, and therefore the DLP agent does not perform additional analysis on the paste data, i.e., the DLP agent blocks the paste operation from proceeding. On the other hand, matching process IDs indicate that the paste operation was performed on the current application window. In such a case, the paste operation could have been performed by either the user or the application. Therefore, the DLP agent also evaluates a system message queue of the OS. The system message queue includes information describing activity, such as keyboard and mouse events, by the user at a given moment. The DLP agent may determine, based on the system message queue and the active application window information, that the user initiated the paste operation. In such a case, the DLP agent analyzes the paste operation. The DLP agent may further generate an incident report describing the paste operation.

Further, the techniques described herein may be applied to modern applications that use a runtime broker to manage sandboxed applications, i.e., applications that do not have direct access to system resources. One example of such an application is Microsoft Windows Store Application. In such a case, the DLP agent hooks the clipboard API calls performed by the runtime broker, in contrast to hooking the clipboard API calls performed by applications described above. During a clipboard operation, the DLP agent determines the client ID provided by the runtime broker to determine whether the clipboard operation is user- or application-initiated.

Embodiments presented herein describe evaluating clipboard operations performed on a client computing system. Advantageously, intercepting clipboard API calls and monitoring information associated with a copy or paste operation such as source application, active application window titles, and clipboard data allows the DLP agent to determine when to block a clipboard operation from occurring. Further, when the DLP agent blocks a given paste operation, the DLP agent has information about the operation that may be meaningful to an administrator. In addition, by monitoring a system message queue of the operating system, the DLP agent may determine whether a clipboard operation is initiated by a user or an application.

Figure 1:
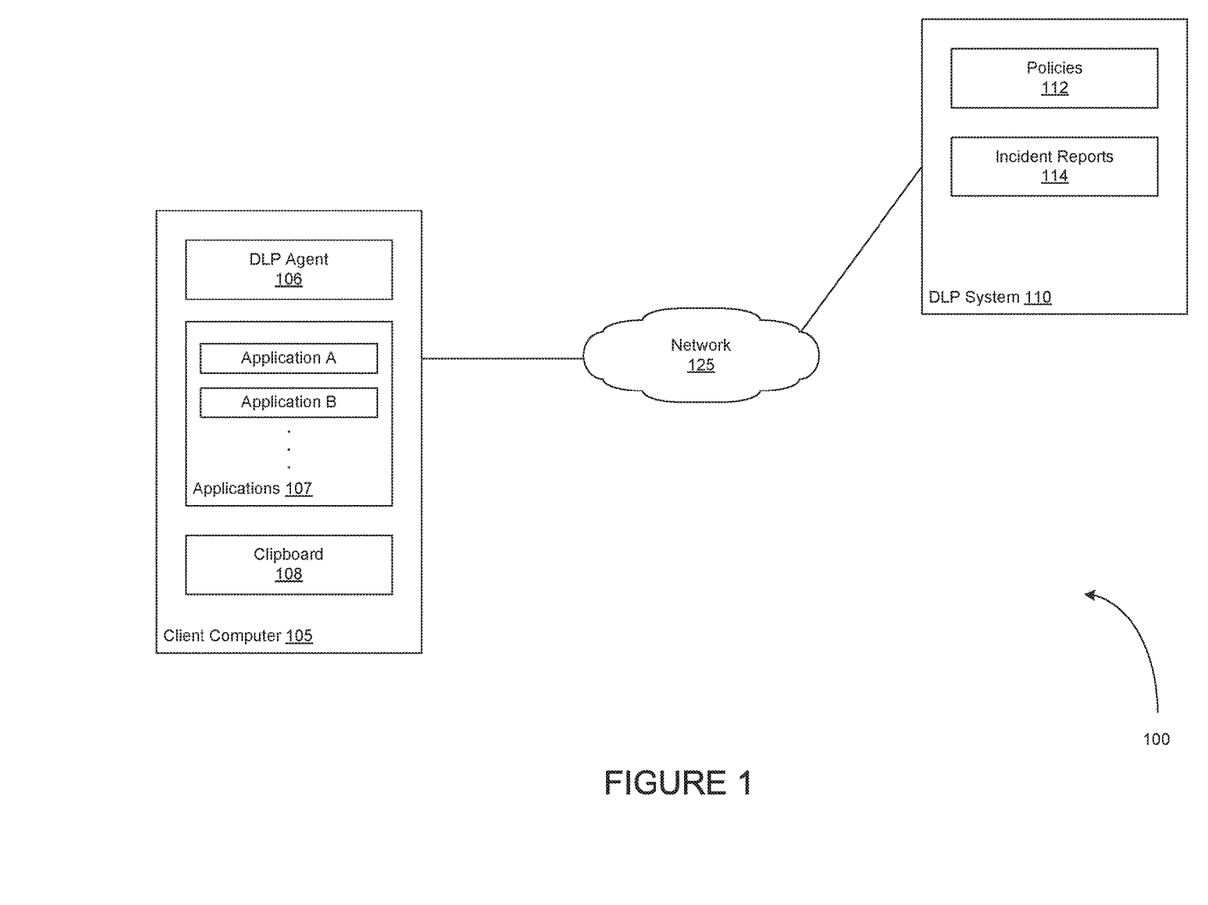
FIG. 1 illustrates an example computing environment, according to one embodiment.

FIG. 1 illustrates an example computing environment 100, according to one embodiment. As shown, computing environment 100 includes a client computer 105, a data loss prevention (DLP) system 110, and a network 125. In one embodiment, the client computer 105 is a physical computing system, such as a desktop, a laptop, etc. The client computer 105 may be one of many client computers residing within an enterprise network.

In one embodiment, the client computer 105 includes a DLP agent 106, one or more applications 107, and a clipboard 108. The DLP agent 106 monitors and controls activity occurring within the client computer 105. The DLP agent 106 blocks attempted transmissions of sensitive data (e.g., personal information, confidential information, and the like) to locations unauthorized by specified policies 112 (e.g., maintained on the DLP system 110).

The clipboard 108 is a temporary storage area for data that a user wants to copy from one location to another. For example, a user can copy text in a given document and paste the text in another location within the same document. As another example, the user can copy text in a given document to paste in another location in another application, such as a text area in an e-mail client. An operating system (OS) of the client computer 105 allows applications to access the clipboard through an application programming interface (API) for the clipboard. Generally, when a user performs a clipboard operation using a given application 107 the application 107 calls the corresponding function in the clipboard API. The data may be stored in and later retrieved from the clipboard 108. The clipboard 108 may store data in various formats, such as text formats (plain text, rich text formats (RTF), etc.), image formats, and the like.

Because a user can copy data from one application 107 to another, one function of the DLP agent 106 is to prevent sensitive data to an unauthorized location. For example, it is undesirable for a user to copy sensitive data, such as social security numbers, from cells in a spreadsheet to a personal e-mail account.

In one embodiment, the DLP agent 106 hooks the clipboard API. Doing so allows the DLP agent 106 to intercept calls made to the clipboard API from applications 107. As described below, the DLP agent 106 may monitor information associated with a copy or paste operation, such as the data being copied or pasted, the source and destination applications for the clipboard operation, and whether the clipboard operation was performed by the user or an application. Further, the DLP agent 106 may determine, based on such information, whether to block a given paste operation from proceeding. If so, then the DLP agent 106 may send the information to the DLP system 110. In turn, the DLP system 110 may generate an incident report 114 describing the information. An administrator may later review incident reports 114 to determine remedial measures.

Figure 2:
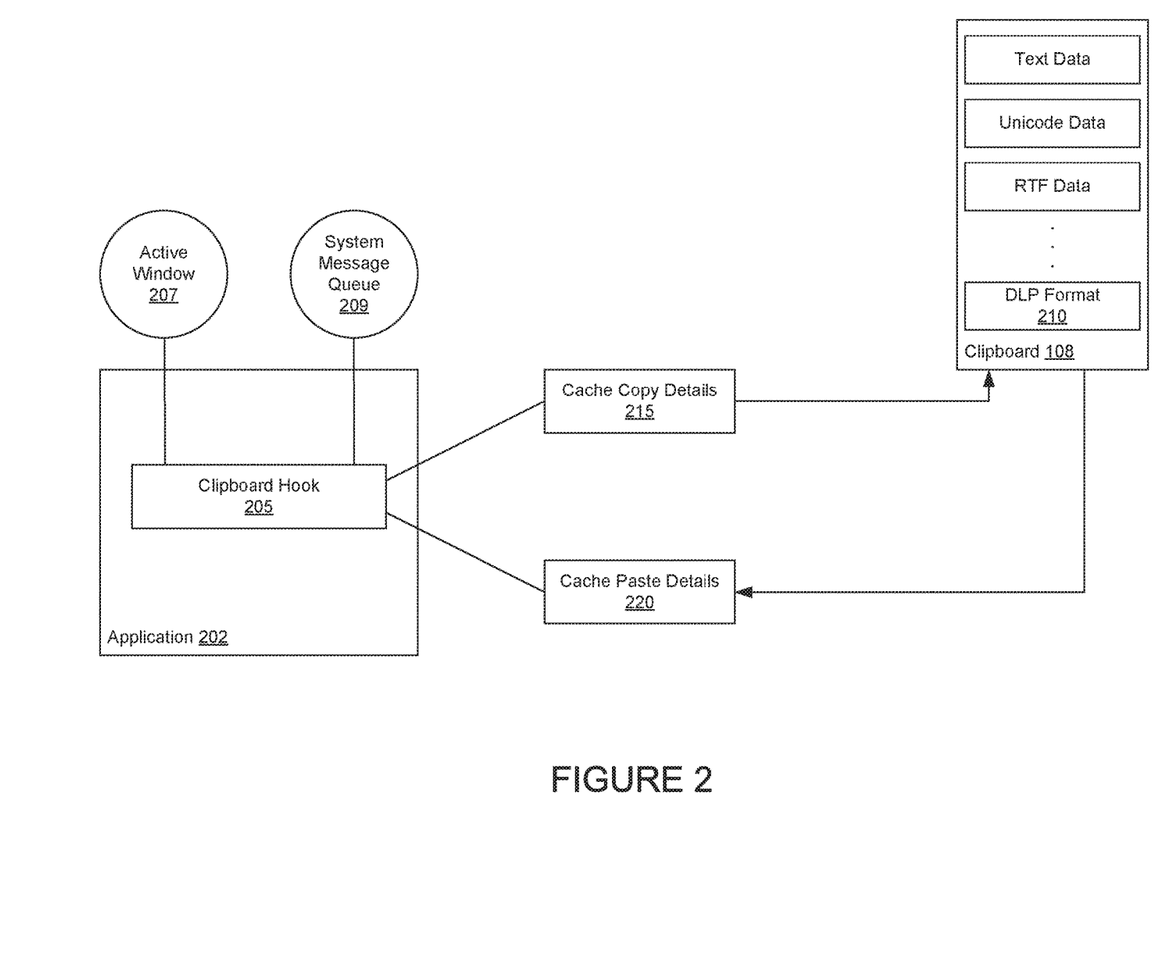
FIG. 2 illustrates a conceptual diagram of providing data leakage protection (DLP) during clipboard operations, according to one embodiment.

FIG. 2 illustrates a conceptual diagram describing techniques for providing DLP during clipboard operations, according to one embodiment. In this example, assume application 202 allows users to create and edit spreadsheets. Of course, the application 202 could be any application that accesses the clipboard 108 (e.g., word processors, messaging applications, web browsers, and the like).

As shown, the application 202 includes a clipboard hook 205. As stated, the DLP agent 106 may hook a clipboard API provided by the OS. Doing so allows the DLP agent 106 to monitor clipboard API calls made by the application 202.

The clipboard 108 may store data in various formats, such as plain text, Unicode data, RTF data, image data, and the like. In one embodiment, when a user performs a copy operation, the DLP agent 106 may generate a DLP format 210 instance to associate with the data. The DLP format 210 includes information related to the source application, such as source application name, process ID, window title, and the like. Illustratively, the instance of the DLP format 210 can be stored in the clipboard 108.

In one embodiment, when a user performs a copy operation, the DLP agent 106 generates a hash of the data copied to the clipboard. Further, the DLP agent 106 stores the DLP format 210 on the clipboard 108 and the hash of the data. Thereafter, when the user performs a paste operation, the DLP agent 106 intercepts the paste operation via the clipboard hook 205. The DLP agent 106 retrieves the data saved in the clipboard 108, along with the DLP format 210 instance.

The DLP agent 106 generates a hash of the content to be pasted. Further, the DLP agent 106 obtains a title of the current application window (i.e., the window into which the user wants to paste the content). The DLP agent 106 compares the paste data hash and the current window title with the copy data hash and the copy window title. If the values match, then the DLP agent 106 allows the paste operation to proceed. Otherwise, the DLP agent 106 may block the paste operation based on the DLP policy 112. Prior to doing so, the DLP agent 106 first determines whether the paste operation is user-initiated or application-initiated. Generally, the DLP agent 106 blocks the paste operation from proceeding if the application initiated the operation.

In one embodiment, the DLP agent 106 monitors an active window 207 to determine whether the paste operation is user-initiated or application-initiated. That is, a paste operation is likely user-initiated if the process ID of the application associated with the active window 207 matches the process ID of the application performing the paste operation. To further confirm that the paste operation is user-initiated, the DLP agent 106 also monitors a system message queue 209 of the operating system. The system message queue 209 includes activity performed by the user, such as keyboard and mouse events. The DLP agent 106 may identify a paste operation in the system message queue 209 occurring at a given time. If the DLP agent 106 determines that a given paste operation has occurred based on the system message queue 209, where the process IDs of the active window 207 and the process ID of the application performing the paste operation matches, then the paste operation is user-initiated. In such a case, the DLP agent 106 evaluates the data under the DLP policy 112, e.g., to determine whether the data corresponds to sensitive data according to the policy 112. Further, the DLP agent 106 may block the paste operation from proceeding if so. The DLP agent 106 may send information describing the paste operation to the DLP system 110, which in turn may generate an incident report for the paste operation.

In an alternative embodiment, the computing system executes an operating system that includes a runtime broker process used to manage one or more sandboxed applications. A sandboxed application does not have direct access to resources of the computing system. Instead, the runtime broker provides access to the resources, such as to the clipboard API. In such a case, if any of the sandboxed applications call the clipboard API, the DLP agent 106 determines, through the runtime broker, which of the sandbox applications called to the clipboard API. To do so, the DLP agent 106 may hook API calls made by the runtime broker. In particular, the DLP agent 106 may intercept an impersonate client operation that the runtime broker calls when a sandboxed application tries to copy or paste data. During such an operation, the runtime broker impersonates the sandboxed application. Intercepting the operation allows the DLP agent 106 to identifying information associated with the sandboxed application, such as a process ID, thread ID mapping, and the like. When the sandboxed application copies data, the DLP agent 106 can generate a DLP format 210 instance that includes such information.

Figure 3:
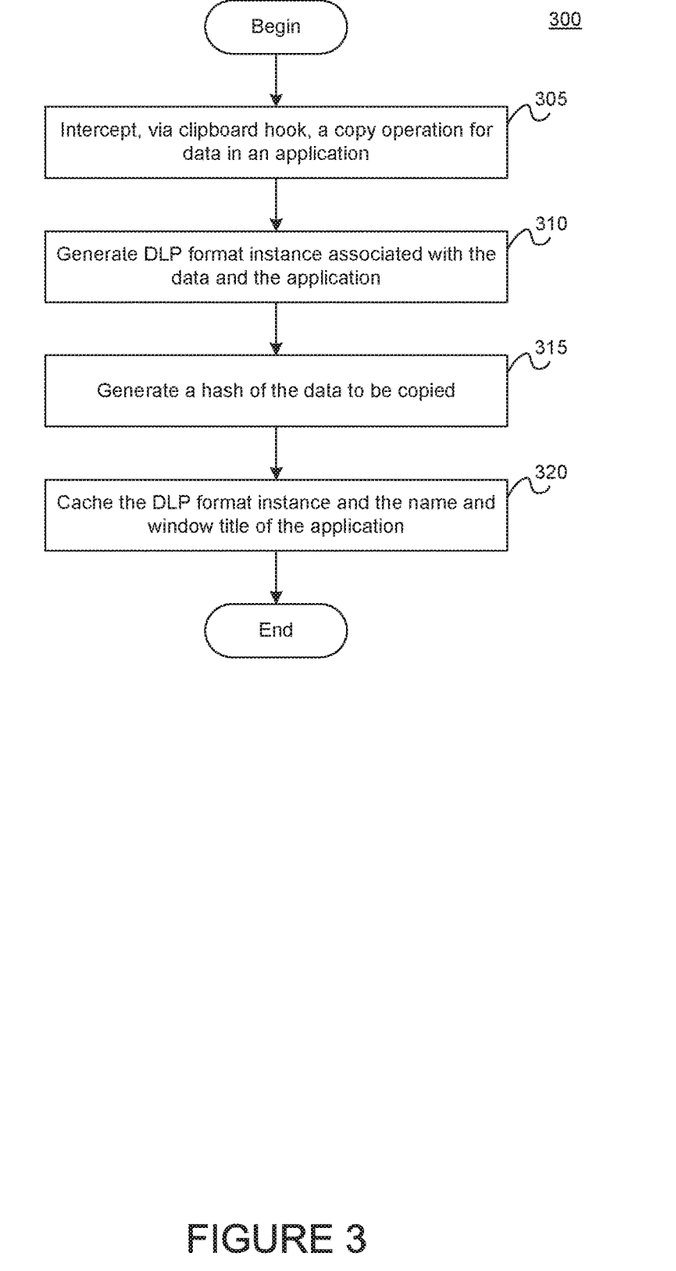
FIG. 3 illustrates a method for performing a copy operation on a computing system that provides DLP during clipboard operations, according to one embodiment.

FIG. 3 illustrates a method 300 for managing a clipboard operation, according to one embodiment. At step 305, the DLP agent 106 intercepts a copy operation to store content from an application on the clipboard. For example, assume a user selects a block of text in a document and executes a command to copy the text. When this occurs, the word processor application makes a call to store the selected text into the clipboard 108. The DLP agent 106 intercepts the call.

At step 310, the DLP agent 106 generates a DLP format instance. The DLP format instance includes information about the application making the clipboard API call. Such information may include the source application name, process ID, window title, web page URL, etc. In this example, the DLP format would include information describing the word processor application, such as the name of the application, process ID, window title, and the like.

At step 315, the DLP agent 106 generates a hash of the data being copied to the clipboard. The DLP agent 106 may later use the hash during a paste operation of the same data. At step 320, the DLP agent 106 saves the DLP format instance, the name and window title of the application into the clipboard 108.

Figure 4:
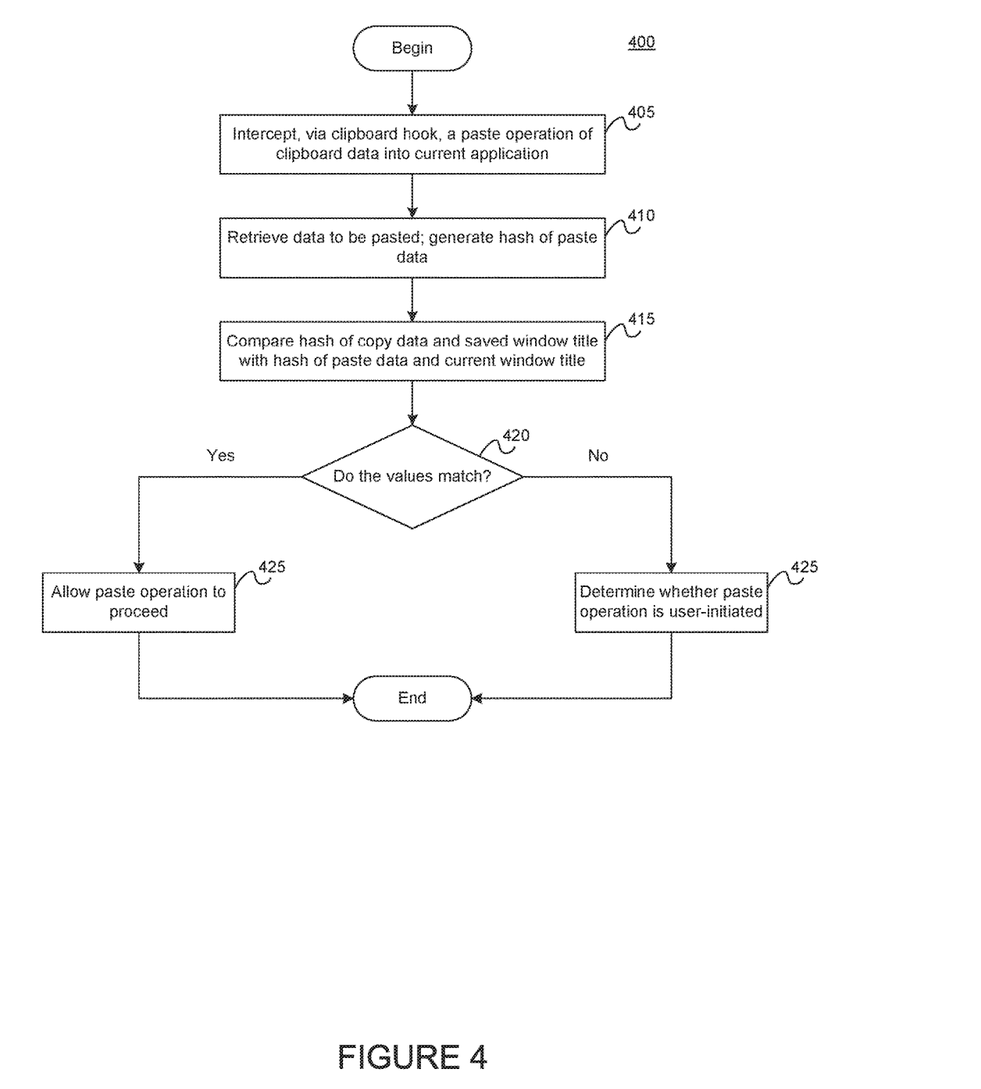
FIG. 4 illustrates a method for performing a paste operation on a computing system that provides DLP during clipboard operations, according to one embodiment.

FIG. 4 illustrates a method 400 for performing a paste operation on a computing system that provides DLP during clipboard operations, according to one embodiment.

At step 405, the DLP agent 106, using the clipboard hook, intercepts a paste operation of clipboard data into a current application. At step 410, the DLP agent 106 retrieves the data to be pasted from the clipboard 108. The DLP agent 106 then generates a hash of the data. Further, the DLP agent 106 may also retrieve the DLP format associated with the paste data. As stated, the DLP format includes context related to the application where the data originated, such as the source application name, process ID, window title, and the like.

At step 410, the DLP agent 106 compares the paste hash data and current window title with the copy hash data and the copy window title. At step 420, the DLP agent 106 determines whether the values match. Matching hash data and window titles indicate that the paste operation will occur within the same application and application window. Therefore, if the hash values and the window titles match, then at step 425, the DLP agent 106 allows the paste operation to proceed. Otherwise, then at step 430, the DLP agent 106 determines whether the paste operation is user-initiated or application-initiated. If the paste operation is user-initiated, then the DLP agent 106 may determine whether to block the paste operation from proceeding.

Figure 5:
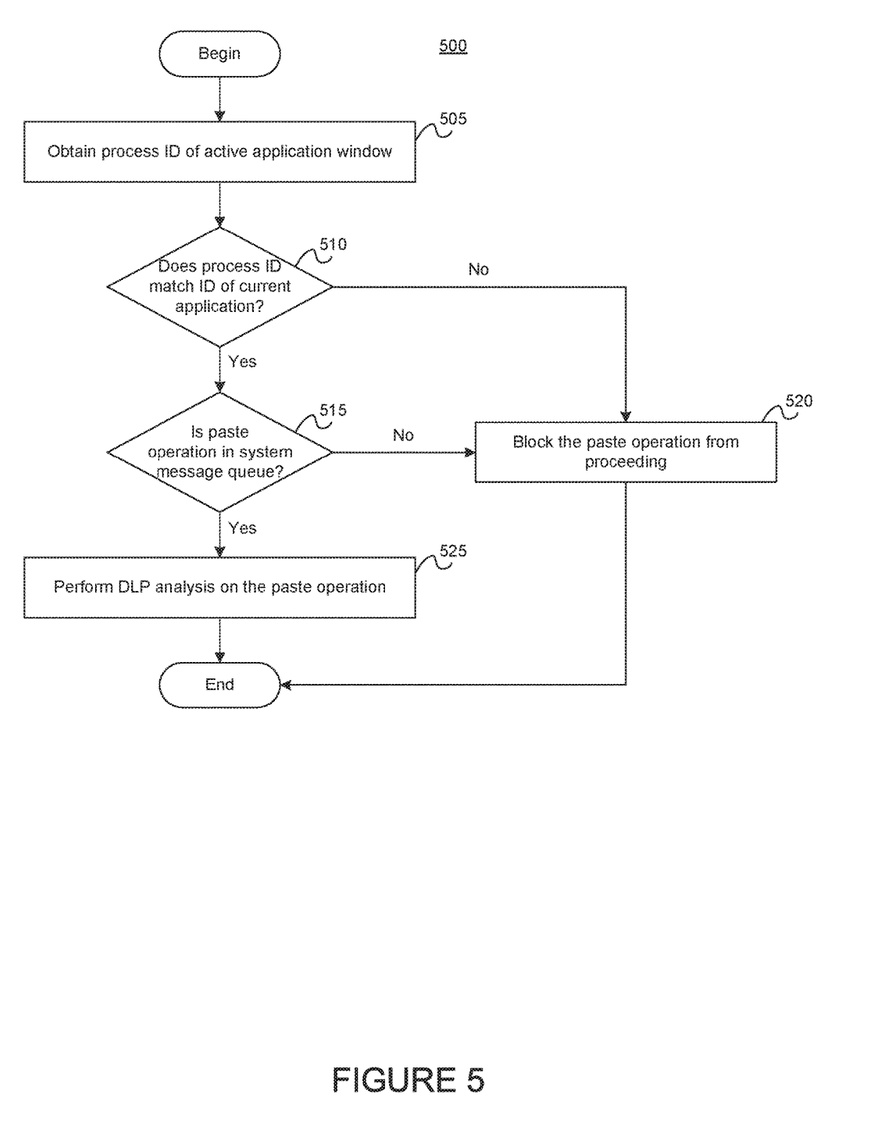
FIG. 5 illustrates a method for determining whether a paste operation is user-initiated or application initiated, according to one embodiment.

FIG. 5 illustrates a method 500 for determining whether a paste operation is user-initiated or application-initiated, according to one embodiment. At step 505, the DLP agent 106 obtains the process ID of the active window 207. At step 510, the DLP agent 106 determines whether the process ID of the active window 207 matches the process ID of the current application. If the process IDs do not match, then at step 520, the DLP agent 106 determines that the paste operation is application-initiated. If application-initiated, the DLP agent 106 blocks the paste operation from proceeding.

However, if the process IDs match, the DLP agent 106 evaluates the system message queue 209. As stated, the system message queue 209 includes information describing user activity, such as keyboard and mouse events at a given moment. At step 515, the DLP agent 106 determines whether the system message queue 209 contains activity corresponding to a paste operation at the time of the paste operation. If not, then at step 520, the DLP agent 106 determines that the paste operation is application-initiated. If application-initiated, the DLP agent 106 blocks the paste operation from proceeding.

Otherwise, if the system message queue 209 contains activity corresponding to a paste operation, then the DLP agent 106 determines that the paste operation is user-initiated. In such a case, at step 525, the DLP agent 106 evaluates the paste data against a DLP policy, e.g., to determine whether the paste data corresponds to sensitive data. If so, then the DLP agent 106 blocks the paste operation from occurring. Further, the DLP agent 106 can generate an incident report containing information about the paste operation.

Figure 6:
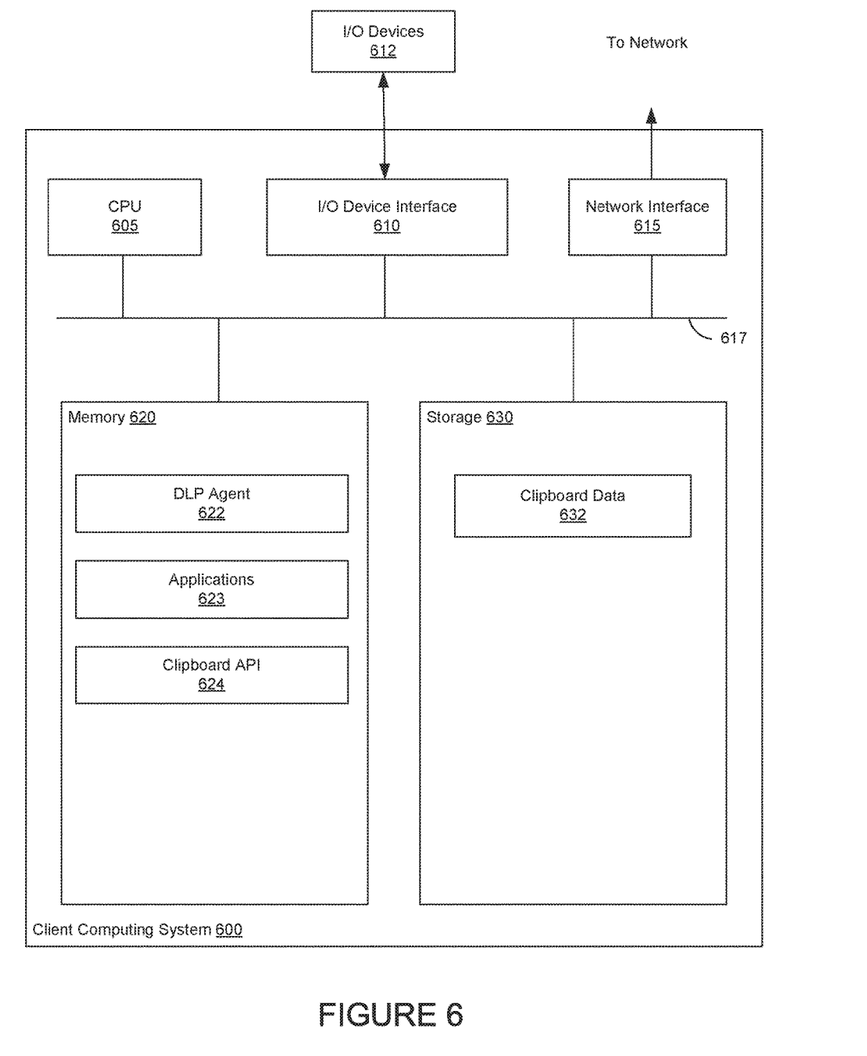
FIG. 6 illustrates a client computing system configured to provide DLP during clipboard operations, according to one embodiment.

FIG. 6 illustrates a client computing system 600 configured to provide DLP during clipboard operations, according to one embodiment. As shown, computing system 600 includes, without limitation, a central processing unit (CPU) 605, a network interface 615, a memory 620, and storage 630, each connected to a bus 617. The client computing system 600 may also include an I/O device interface 610 connecting I/O devices 612 (e.g., keyboard, display, mouse devices, etc.) to the client computing system 600. Further, in context of the present disclosure, the computing elements shown in the computing system 600 may correspond to a physical computing system (e.g., a system in an enterprise network).

CPU 605 retrieves and executes programming instructions stored in memory 620 as well as stores and retrieves application data residing in the storage 630. The bus 617 is used to transmit programming instructions and application data between CPU 605, I/O devices interface 610, storage 630, network interface 615, and memory 620. Note, CPU 605 is included to be representative of a single CPU, multiple CPUs, a single CPU having multiple processing cores, and the like. Memory 620 is generally included to be representative of a random access memory. Storage 630 may be a disk drive storage device. Although shown as a single unit, storage 630 may be a combination of fixed and/or removable storage devices, such as fixed disc drives, removable memory cards, or optical storage, network attached storage (NAS), or a storage area-network (SAN).

Illustratively, memory 620 includes a DLP agent 622, one or more applications 623, and a clipboard API 624. And storage 630 includes clipboard data 632. The DLP agent 622 hooks the clipboard 624. As a result, if any of the applications 623 calls a function of the clipboard API, the DLP agent 622 intercepts the call.

When a copy operation occurs, the DLP agent 622 saves a DLP format instance into the clipboard along with the data (i.e., clipboard data 632). The DLP format includes information describing the source application calling the copy operation, e.g., source application name, process ID, window title, URL, and the like. When a paste operation occurs, the DLP agent 622 intercepts the operation. The DLP agent 622 retrieves the clipboard data 632, which includes the DLP format and the data to be pasted. The DLP agent 622 generates a hash of the paste data. The DLP agent 622 also determines a title of the current application window. The DLP agent 622 evaluates the copy hash data and the window title provided in the DLP format against the paste hash data and the title of the current application window. If the values match, then the DLP agent 622 allows the paste operation to proceed. If the values do not match, then the DLP agent 622 determines whether the paste operation is user-initiated or application-initiated. If user-initiated, then the DLP agent 622 may evaluate the paste data to determine whether the data conforms to a DLP policy. If not, then the DLP agent 622 may block the paste operation from proceeding and generate an incident report on the attempted paste operation.

The preceding discussion presents a variety of embodiments. However, the present disclosure is not limited to the specifically described embodiments. Instead, any combination of the following features and elements, whether related to different embodiments or not, is contemplated to implement and practice the techniques described herein. Furthermore, although embodiments of the present disclosure may achieve advantages over other possible solutions and/or over the prior art, whether or not a particular advantage is achieved by a given embodiment is not limiting of the present disclosure. Thus, the following aspects, features, embodiments and advantages are merely illustrative and are not considered elements or limitations of the appended claims except where explicitly recited in a claim(s).

Aspects may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

The flowchart and block diagrams in the figures illustrate the architecture, functionality and operation of possible implementations of systems, methods and computer program products according to various embodiments presented herein. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

The following discussion presents a variety of embodiments. However, the present disclosure is not limited to the specifically described embodiments. Instead, any combination of the following features and elements, whether related to different embodiments or not, is contemplated to implement and practice the techniques described herein. Furthermore, although embodiments of the present disclosure may achieve advantages over other possible solutions and/or over the prior art, whether or not a particular advantage is achieved by a given embodiment is not limiting of the present disclosure. Thus, the following aspects, features, embodiments and advantages are merely illustrative and are not considered elements or limitations of the appended claims except where explicitly recited in a claim(s).

Aspects may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

The flowchart and block diagrams in the figures illustrate the architecture, functionality and operation of possible implementations of systems, methods and computer program products according to various embodiments presented herein. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method for protecting against data loss events on a computing system in which applications execute in a sandboxed environment, comprising:
    intercepting a first clipboard application programming interface (API) call performed by a runtime broker requesting that data from a first sandboxed application isolated from resources of the computing system and impersonated by the runtime broker be copied to a clipboard;
    retrieving, from the runtime broker, information identifying the first sandboxed application from which the data is copied, wherein the information identifying the first sandboxed application includes a process ID of the first sandboxed application;
    storing the data and the information identifying the first sandboxed application into the clipboard;
    intercepting a second clipboard API call performed by the runtime broker requesting that a paste operation be executed to paste the data into a second sandboxed application isolated from the resources of the computing system and impersonated by the runtime broker;
    retrieving information identifying the second sandboxed application, wherein the information identifying the second sandboxed application includes a process ID of the second sandboxed application;
    comparing the information identifying the second application to the information identifying the first application; and
    taking one or more actions to control execution of the paste operation based at least in part on the comparison, wherein the one or more actions comprise:
        allowing the paste operation to execute based on the comparison indicating that the information identifying the first application and the information identifying the second application match;
        allowing the paste operation to execute based on the comparison indicating that the information identifying the first application and the information identifying the second application do not match and on a determination that the data does not correspond to sensitive data under a policy; or blocking the paste operation based on the comparison indicating that the information identifying the first application and the information identifying the second application do not match and on a determination that the data corresponds to sensitive data under the policy.

2. The method of claim 1, wherein the one or more actions further comprise:

determining that the information identifying the second application does not match the information identifying the first application; and determining whether the paste operation is user-initiated or application-initiated.

3. The method of claim 2, further comprising:

upon determining that the paste operation is application-initiated, blocking the data from being pasted.

4. The method of claim 2, further comprising:

upon determining the paste operation is user-initiated, determining that the data includes sensitive data based on the policy; and blocking the paste operation.

5. The method of claim 1, wherein comparing the information identifying the second application to the information identifying the first application comprises:

comparing the process ID of the first application to the process ID of the second application.

6. A non-transitory computer-readable medium storing instructions thereon which, when executed on a processor, perform operations for protecting against data loss events on a computing system in which applications execute in a sandboxed environment, the operations comprising:

intercepting a first clipboard application programming interface (API) call performed by a runtime broker requesting that data from a first sandboxed application isolated from resources of the computing system and impersonated by the runtime broker be copied to a clipboard;

retrieving, from the runtime broker, information identifying the first sandboxed application from which the data is copied, wherein the information identifying the first sandboxed application includes a process ID of the first sandboxed application;

storing the data and the information identifying the first sandboxed application into the clipboard;

intercepting a second clipboard API call performed by the runtime broker requesting that a paste operation be executed to paste the data into a second sandboxed application isolated from the resources of the computing system and impersonated by the runtime broker;

retrieving information identifying the second sandboxed application, wherein the information identifying the second sandboxed application includes a process ID of the second sandboxed application;

comparing the information identifying the second application to the information identifying the first application; and taking one or more actions to control execution of the paste operation based at least in part on the comparison, wherein the one or more actions comprise:

allowing the paste operation to execute based on the comparison indicating that the information identifying the first application and the information identifying the second application match;

allowing the paste operation to execute based on the comparison indicating that the information identifying the first application and the information identifying the second application do not match and on a determination that the data does not correspond to sensitive data under a policy; or blocking the paste operation based on the comparison indicating that the information identifying the first application and the information identifying the second application do not match and on a determination that the data corresponds to sensitive data under the policy.

7. The non-transitory computer-readable medium of claim 6, wherein the one or more actions further comprise:

determining that the information identifying the second application does not match the information identifying the first application; and determining whether the paste operation is user-initiated or application-initiated.

8. The non-transitory computer-readable medium of claim 7, wherein the operations further comprise:

upon determining that the paste operation is application-initiated, blocking the data from being pasted.

9. The non-transitory computer-readable medium of claim 7, wherein the operations further comprise:

upon determining the paste operation is user-initiated, determining that the data includes sensitive data based on the policy; and blocking the paste operation.

10. The non-transitory computer-readable medium of claim 6, wherein comparing the information identifying the second application to the information identifying the first application comprises:

comparing the process ID of the first application to the process ID of the second application.

11. A computing system comprising:

a processor; and a memory storing program code which, when executed on the processor, performs operations for protecting against data loss events on the computing system in which applications execute in a sandboxed environment, the operations comprising:

intercepting a first clipboard application programming interface (API) call performed by a runtime broker requesting that data from a first sandboxed application isolated from resources of the computing system and impersonated by the runtime broker be copied to a clipboard;

retrieving, from the runtime broker, information identifying the first sandboxed application from which the data is copied, wherein the information identifying the first sandboxed application includes a process ID of the first sandboxed application;

storing the data and the information identifying the first sandboxed application into the clipboard;

intercepting a second clipboard API call performed by the runtime broker requesting that a paste operation be executed to paste the data into a second sandboxed application isolated from the resources of the computing system and impersonated by the runtime broker;

retrieving information identifying the second sandboxed application, wherein the information identifying the second sandboxed application includes a process ID of the second sandboxed application;

comparing the information identifying the second application to the information identifying the first application; and taking one or more actions to control execution of the paste operation based at least in part on the comparison, wherein the one or more actions comprise:
allowing the paste operation to execute based on the comparison indicating that the information identifying the first application and the information identifying the second application match;
allowing the paste operation to execute based on the comparison indicating that the information identifying the first application and the information identifying the second application do not match and on a determination that the data does not correspond to sensitive data under a policy; or
blocking the paste operation based on the comparison indicating that the information identifying the first application and the information identifying the second application do not match and on a determination that the data corresponds to sensitive data under the policy.

12. The computing system of claim 11, wherein the one or more actions further comprise:
determining that the information identifying the second application does not match the information identifying the first application; and
determining whether the paste operation is user-initiated or application-initiated.

13. The computing system of claim 12, wherein the operations further comprise:
upon determining that the paste operation is application-initiated, blocking the data from being pasted.

14. The computing system of claim 12, wherein the operations further comprise:
upon determining the paste operation is user-initiated, determining that the data includes sensitive data based on the policy; and
blocking the paste operation.

15. The computing system of claim 11, wherein comparing the information identifying the second application to the information identifying the first application comprises:
comparing the process ID of the first application to the process ID of the second application.

* * * * *